United States Patent
Siewert et al.

(10) Patent No.: US 9,028,247 B2
(45) Date of Patent: May 12, 2015

(54) COMBUSTION CHAMBER AND METHOD FOR DAMPING PULSATIONS

(75) Inventors: Piotr Siewert, Nussbaumen (CH); Rudolf Lachner, Attenkirchen (DE)

(73) Assignee: Alstom Technology Ltd, Baden (CH)

( * ) Notice: Subject to any disclaimer, the term of this patent is extended or adjusted under 35 U.S.C. 154(b) by 695 days.

(21) Appl. No.: 13/296,635

(22) Filed: Nov. 15, 2011

(65) Prior Publication Data

US 2012/0122043 A1   May 17, 2012

(30) Foreign Application Priority Data

Nov. 17, 2010   (EP) ..................................... 10191548

(51) Int. Cl.
| | |
|---|---|
| *F23N 1/00* | (2006.01) |
| *F23R 3/34* | (2006.01) |
| *F02C 7/22* | (2006.01) |
| *F02C 7/232* | (2006.01) |
| *F23M 20/00* | (2014.01) |

(52) U.S. Cl.
CPC .............. *F23R 3/34* (2013.01); *Y10T 29/49348* (2013.01); *F02C 7/222* (2013.01); *F02C 7/232* (2013.01); *F23R 2900/00013* (2013.01); *F23R 2900/00016* (2013.01); *F23M 20/005* (2013.01)

(58) Field of Classification Search
CPC ....... F23N 1/00; F23N 1/022; F23N 2035/16; F23N 2035/18; F23N 2035/12; F23N 2035/26
USPC ...................................... 431/217, 214, 12, 76
See application file for complete search history.

(56) References Cited

U.S. PATENT DOCUMENTS

| | | | | |
|---|---|---|---|---|
| 2,582,809 | A | * | 1/1952 | Weir ................................ 60/263 |
| 2,806,354 | A | * | 9/1957 | Cook ............................... 60/804 |
| 5,257,502 | A | * | 11/1993 | Napoli ............................ 60/739 |
| 5,261,222 | A | | 11/1993 | Napoli |
| 5,303,542 | A | * | 4/1994 | Hoffa .............................. 60/773 |
| 6,370,863 | B2 | * | 4/2002 | Muller et al. ................... 60/776 |
| 7,484,352 | B2 | | 2/2009 | Flohr et al. |
| 7,513,117 | B2 | | 4/2009 | Garay et al. |
| 7,780,437 | B2 | | 8/2010 | Bernero et al. |
| 7,901,203 | B2 | | 3/2011 | Ni et al. |
| 2005/0032013 | A1 | | 2/2005 | Bucche et al. |
| 2006/0183069 | A1 | | 8/2006 | Bernero et al. |
| 2007/0105061 | A1 | | 5/2007 | Flohr et al. |
| 2007/0238059 | A1 | | 10/2007 | Garay et al. |
| 2007/0271927 | A1 | | 11/2007 | Myers et al. |

FOREIGN PATENT DOCUMENTS

| | | |
|---|---|---|
| DE | 19825335 A1 | 12/1999 |
| DE | 102004015187 A1 | 10/2005 |
| DE | 102004036911 A1 | 3/2006 |
| DE | 102004049491 A1 | 4/2006 |

(Continued)

*Primary Examiner* — Avinash Savani

(74) *Attorney, Agent, or Firm* — Buchanan Ingersoll & Rooney PC

(57) ABSTRACT

A combustion chamber is provided and includes a combustion device and a supply circuit arranged to feed fuel at a plurality of locations of the combustion device. The supply circuit includes manifolds collecting fuel to be distributed among at least some of the locations, ducts extending from the manifolds and feeding the locations. Some of the ducts carry valves having a plurality of predetermined working positions, each working position corresponding to a different fuel flow through the valve.

19 Claims, 2 Drawing Sheets

(56) References Cited

FOREIGN PATENT DOCUMENTS

| | | | |
|---|---|---|---|
| DE | 102006059532 A1 | 8/2007 | |
| DE | 102006015230 A1 | 10/2007 | |
| DE | 102006015529 A1 | 10/2007 | |
| EP | 1645802 A2 | 4/2006 | |
| GB | 2296562 A | 7/1996 | |
| GB | 2341641 A | 3/2000 | |
| WO | 02061337 A1 | 8/2002 | |
| WO | 2008052867 A1 | 5/2008 | |

* cited by examiner

COMBUSTION CHAMBER AND METHOD FOR DAMPING PULSATIONS

RELATED APPLICATION

The present application hereby claims priority under 35 U.S.C. Section 119 to European Patent application number 10191548.6, filed Nov. 17, 2010, the entire contents of which are hereby incorporated by reference.

FIELD OF INVENTION

The present invention relates to a combustion chamber and a method for damping pulsations. In particular the combustion chamber is a component of a gas turbine engine.

BACKGROUND

Gas turbine engines are known to comprise a compressor, one or more combustion chambers and one or more turbines. The compressor supplies compressed air to the combustion chambers wherein a fuel is injected and combusted, generating hot gases that are expanded in the turbines, to gather mechanical work.

Typically a combustion chamber has an annular combustion device connected to nozzles that supply fuel into it (diffusion combustion chamber) or mixing devices that supply a mixture of air and fuel into it.

One of the key factors for the gas turbine engine operation is the flame temperature, i.e. the temperature of the flame within the combustion chamber.

In fact, if the flame temperature is too high the $NO_x$ emissions are high, and if the flame temperature is too low, pulsations are generated within the combustion chamber; for these reasons, during operation, the flame temperature must be within a given range that allows correct operation.

In addition, when operating within the given range, the gas turbine engine operation could also be troubling.

In fact, possible pulsations generated by a single nozzle or a single mixing device are generally influenced and influence the pulsations of adjacent nozzles or mixing devices.

For this reason it is possible that, even when operating within the given range, pulsations are naturally generated at single nozzles or mixing devices (e.g. for mechanical defects or tolerances, particular local conditions, etc) and couple with pulsations of adjacent devices, generating a rotating pulsation wave within the combustion chamber.

These rotating pulsation waves are very detrimental for the gas turbine engine lifetime and must be damped.

In order to damp these rotating pulsation waves, traditionally throttling of fuel to selected nozzles or mixing devices is implemented. Because of this throttling, the selected nozzles or mixing devices generate a flame with a temperature that is lower than the temperature of the flame generated by the other nozzles or mixing devices; in other words, the flame temperature distribution within the annular combustion chamber is uneven, this having a beneficial effect on damping the rotating pulsation wave.

Usually, throttling is achieved by using orifices having a fixed diameter that are installed in the combustor fuel inlet pipe of selected burners. These orifices reduce the fuel flow through the pipe causing a reduced amount of fuel to be injected within the combustion chamber at the selected locations and thus the described reduced flame temperature.

Nevertheless, even if they allow damping of the rotating pulsation wave, the orifices introduce different constraints.

In fact, regulation and optimization of the fuel supplied to nozzles or mixing devices require the replacement of the orifices and are therefore very time consuming; for example the engine must be stopped and re-adjusted every time the orifices are replaced.

In addition, online regulation according to the different operating conditions (and as a result, flame temperature and pulsation level) is not possible.

SUMMARY

The present disclosure is directed to a combustion chamber including a combustion device and a supply circuit configured to feed fuel at a plurality of locations of the combustion device. The supply circuit includes at least one manifold, which collects fuel to be distributed among at least some of the locations. The supply circuit also includes ducts extending from the at least a manifold and feeding at least some of the locations, at least some of the ducts include valves having a plurality of predefined working positions. Each working position corresponds to a different fuel flow through the valve.

Another aspect of the disclosure is directed to a method for damping pulsations in a combustion chamber. The combustion chamber includes a combustion device and a supply circuit configured to feed fuel at a plurality of locations of the combustion device. The supply circuit includes at least one manifold, which collects fuel to be distributed among at least some of the locations. The supply circuit also including ducts extending from the at least a manifold and feeding at least some of the locations. At least some of the ducts include valves having a plurality of predetermined working positions. Each working position corresponds to a different fuel flow through the valve. The method includes damping the pulsations by online regulating the fuel flow at at least some of the locations by selecting the working position of the valves.

In a further aspect, the disclosure is directed to a method for retrofitting a combustion chamber having a combustion device and a supply circuit arranged to feed fuel at a plurality of locations of the combustion device. The supply circuit includes at least one manifold, which collects fuel to be distributed among at least some of the locations. The supply circuit also includes ducts extending from the at least a manifold and feeding at least some of the locations. The method includes providing at least some of the ducts with valves having a plurality of predetermined working positions, each working position corresponding to a different fuel flow through the valve.

BRIEF DESCRIPTION OF THE DRAWINGS

Further characteristics and advantages of the invention will be more apparent from the description of a preferred but non-exclusive embodiment of the combustion chamber and method illustrated by way of non-limiting example in the accompanying drawings, in which.

DETAILED DESCRIPTION OF THE PREFERRED EMBODIMENTS

Introduction to the Embodiments

Figure 1:
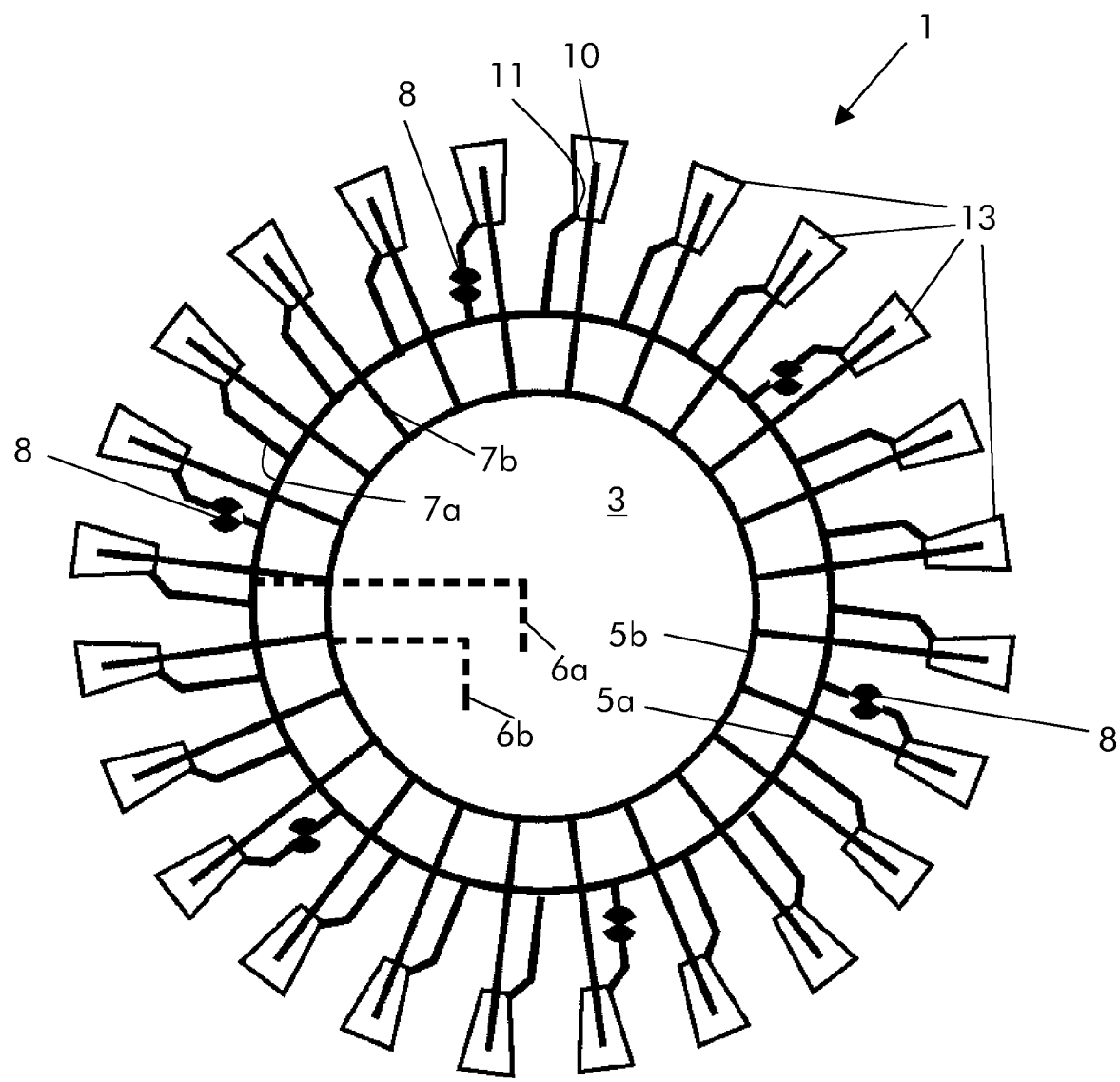
FIG. 1 is a schematic front view of a combustion chamber in an embodiment of the invention; in this figure the combustion device is not shown, it is anyhow clear that the mixing devices are all connected to a combustion device.

It is an object of the present invention to provide a combustion chamber and method addressing the aforementioned problems of the known art.

Within the scope of this technical aim, an aspect of the invention is to provide a combustion chamber and method that allow regulation and optimization of the fuel supplied to nozzles or mixing devices without requiring long outages of the engine.

Another aspect of the invention is to provide a combustion chamber and a method that permit online regulation and optimization of the fuel supplied to nozzles or mixing devices during gas turbine engine operation.

A further aspect of the present invention is to provide a combustion chamber and a method that are inexpensive and reliable.

The technical aim, together with these and further aspects, are attained according to the invention by providing a combustion chamber and a method in accordance with the accompanying claims.

DETAILED DESCRIPTION

With reference to the figures, shown is a combustion chamber 1 having a combustion device 2 with an annular shape; in addition a fuel supply circuit 3 arranged to feed fuel at a plurality of locations of the combustion device 2 is also shown.

The supply circuit includes a first manifold 5a connected to a main line 6a, generally provided with a control valve that is not shown in the attached figures; from the first manifold 5a a plurality of ducts 7a depart; these ducts 7a supply fuel to some of the locations of the combustion device 2.

In addition, a second manifold 5b is also provided; the manifold 5b is connected to a main line 6b also provided with a control valve (not shown); the manifold 5b is connected to ducts 7b to feed other locations of the combustion device 2 with fuel.

As a result, the manifolds 5a and 5b collect fuel and distribute it among the locations.

As shown in the figures, the ducts 7a carry valves 8 having a plurality of prefixed working positions, each working position corresponding to a different fuel flow through the valve 8.

In particular, the valves 8 have two working positions corresponding to a first working position at which the valve 8 is fully open or partially open, and a second working position at which the valve 8 is fully closed or partially closed; it is clear that when the valve is partially/fully open, the fuel flow allowed to pass through it is larger than the fuel flow allowed to pass through it when the same valve 8 is partially/fully closed.

Figure 2:
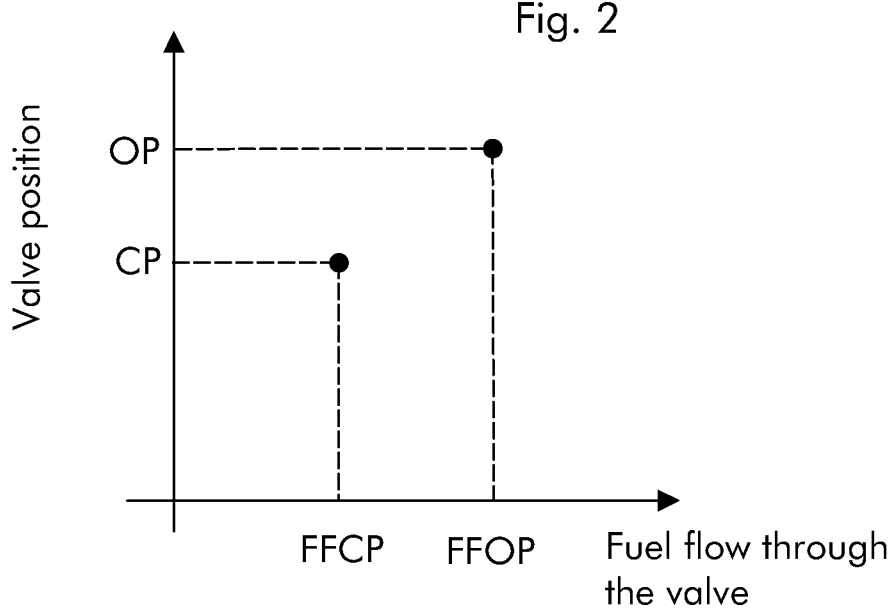
FIG. 2 schematically shows the operating scheme of a valve implementing the invention.

For example FIG. 2 shows an example of the relationship between the valve position and the fuel flow trough the valve 8. From this figure it is apparent that in the open position OP the fuel flow FFOP through the valve is larger than the fuel flow FFCP through it in the closed position CP.

The combustion chamber 1 can advantageously have a plurality of stages that are differently fed with fuel at different operating conditions. For example in the embodiment of FIG. 3 the combustion chamber has two stages, a pilot stage 10 and a premixed stage 11.

In this case, as already described, the combustion chamber 1 preferably has a manifold 5a, 5b for each of the stages to be fed.

Figure 3:
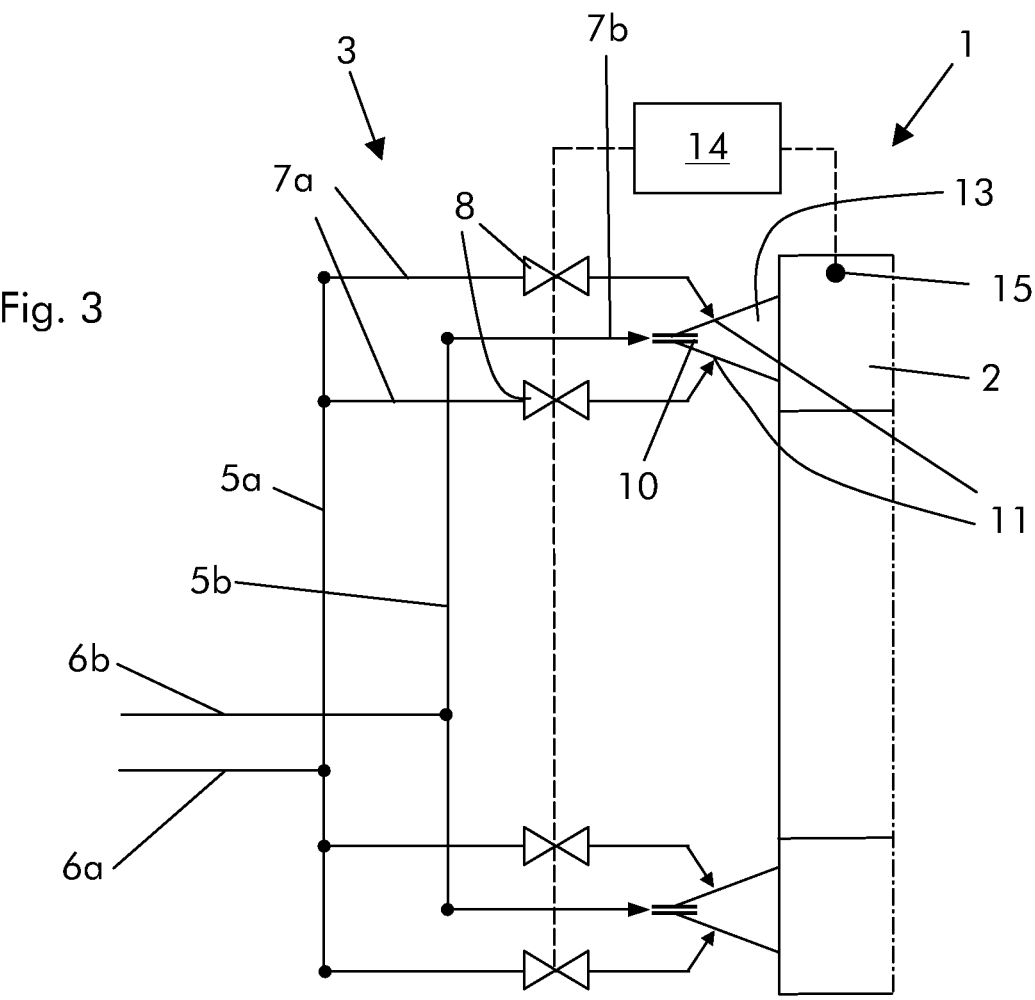
FIG. 3 shows a schematic side view of a combustion chamber in an embodiment of the invention.

In addition, when the combustion chamber 1 has more than one stage, the valves 8 are provided at ducts feeding the same stages; i.e. for example FIG. 3 shows that the valves 8 are provided at the ducts 7a feeding the same stages 11.

Naturally, even if in the embodiment shown the valves are connected to the ducts 7a, it is also possible to have the valves 8 connected to the ducts 7b or also to both ducts 7a and 7b.

From FIG. 1 it is also clear that not all the ducts 7a of the same stage 11 are provided with the valves 8, but advantageously the combustion device locations whose ducts are provided with the valves 8 are equally spaced over the combustion device circumference. Naturally in case the valves 8 are also provided at the ducts 7b, the same consideration applies also to these valves.

In particular, the combustion chamber 1 shown in the attached figures is a premixed combustion chamber and thus each location has at least a mixing device 13; the fuel is supplied into the mixing devices 13 and is mixed with air to generate a mixture that is then burnt into the combustion device 2.

The mixing devices 13 are of a type known in the art and for example have two or more shells defining a conical swirl chamber with a lance projecting axially into it.

A first fuel stage 10 is defined by nozzles at the lance and a second fuel stage 11 is defined by nozzles at the shells. In addition the shells define between each other slots for air entrance into the conical swirl chamber.

Alternatively, the combustion chamber can also be a diffusion combustion chamber; in this embodiment the supply circuit 3 is substantially the same as the one already described. In this embodiment the nozzles typically directly inject fuel within the combustion device (i.e. no mixing devices are provided, into which fuel and air are supplied to generate a mixture that is then conveyed to the combustion device).

In order to control the valves 8 and drive them, a control unit 14 is provided connected to sensors 15 of the pulsations that are housed in or are in communication with the combustion device 2.

Alternatively, different sensors can also be provided, for example sensors 15 can detect emissions; in a preferred embodiment, emissions that can be detected include $NO_x$ emissions, CO emissions, Uncombusted Hydro Carbon emissions, etc. In this case, the sensors 15 can be located within the combustion device 2 or can also be located close to the outlet of the engine.

The control unit 14 is then connected to the valves 8 to control them; the control unit 14 is able to drive each valve 8 from the first position to the second position and vice versa independently from the other valves 8, on the basis of a signal detected by the sensors 15.

The operation of the combustion chamber in embodiments of the invention is apparent from that described and illustrated and is substantially the following.

The valves 8 have a starting configuration that could be for example optimized for operation at low load or part load.

When the gas turbine engine is started and a flame is generated within the combustion device 2, the sensors 15 detect possible pulsations within the combustion device 2 or emissions, such that the control unit 14, on the basis of the information provided by the sensors 15, drive the valves 8, switching each of them to the first and/or second position independently from the other valves 8.

Since the valves 8 are very simple, have only two positions (or in any case a limited number of positions) and no closed loop control is needed for a correct operation, the whole system is inexpensive and easy to regulate.

The proposed configuration can be easily implemented also for retrofitting existing gas turbine engines, in order for example to extend their operating range (i.e. to allow them to correctly operate at a load lower than their minimum design load).

The method for retrofitting a combustion chamber comprises providing at least some of the ducts 7a (and/or ducts 7b) with valves 8 having a plurality of predefined working positions (such as two positions), each position corresponding to a different fuel flow through the valve 8.

In particular, when the combustion chamber 1 has a plurality of stages, the valves 8 are provided at ducts 7a (and/or ducts 7b) feeding the same stages.

Moreover, the locations whose ducts are provided with the valves 8 are equally spaced over the combustion device circumference.

The present invention also refers to a method for damping pulsations in a combustion chamber.

The method comprises damping the pulsations by online regulating the fuel flow at, at least some of, the locations by selecting the working position of the valves 8.

Naturally, the features described may be independently provided from one another.

In practice, the materials used and the dimensions can be chosen at will according to requirements and to the state of the art.

REFERENCE NUMBERS 1 combustion chamber
2 combustion device
3 fuel supply circuit
5a, 5b manifold
6a, 6b main line
7a, 7b ducts
8 valves
10 pilot stage
11 premix stage
13 mixing devices
14 control unit
15 sensor
OP Open Position
CP Closed Position
FFOP Fuel Flow with valve at the Open Position
FFCP Fuel Flow with valve at the Closed Position

What is claimed is:

1. A combustion apparatus comprising a combustion device and a supply circuit configured to feed fuel to a plurality of locations of the combustion device, the supply circuit comprising:
    a plurality of manifolds that collect fuel to be distributed among at least some of the locations,
    ducts extending from the manifolds and feeding at least some of the locations, the ducts comprising first ducts and second ducts, the first ducts having valves, the second ducts not including valves having multiple working positions, the valves of the first ducts having a plurality of predefined working positions, each working position corresponding to a different fuel flow through the valve;
    a plurality of stages,
    wherein there is a respective one of the manifolds for each of the stages to be fed operatively connected to that stage via at least one of the ducts, and wherein the first ducts provided with valves feed the same stage.

2. The combustion apparatus according to claim 1, wherein the valves of the first ducts have at least two working positions.

3. The combustion apparatus according to claim 1, wherein at a first working position, the valves of the first ducts are fully open.

4. The combustion apparatus according to claim 1, wherein at a second working position the valves of the first ducts are fully closed.

5. The combustion apparatus according to claim 1, wherein the valves of the first ducts are provided at ducts feeding the same stages.

6. The combustion apparatus according to claim 1, wherein the stages are comprised of a first stage and a second stage and the manifolds are comprised of a first manifold and a second manifold, the first manifold being connected to the first stage via at least one of the first ducts to supply fuel to that first stage and the second manifold being connected to the second stage via at least one of the second ducts to supply fuel to that second stage.

7. The combustion apparatus according to claim 1, wherein the combustion device locations whose first ducts are provided with the valves that are equally spaced over a circumference of the combustion device.

8. The combustion apparatus according to claim 1, comprising:
    wherein each location that is spaced over the circumference of the combustion chamber has at least one mixing device attached to at least one of the first ducts, and wherein fuel is supplied into the mixing devices and is mixed with air to generate a mixture that is then fed into the combustion device to be burned in the combustion device.

9. The combustion apparatus according to claim 1, wherein the supply circuit comprises nozzles directly injecting fuel within the combustion device.

10. The combustion apparatus according to claim 1, further comprising a control unit connected to pulsation and/or emission sensors, the control unit configured to control the valves and drive them.

11. The combustion apparatus according to claim 10, wherein the control unit is configured to drive each valve from the first position to the second position and vice versa independently from the other valves.

12. A method for damping pulsations in a combustion apparatus, the combustion apparatus comprising a combustion device and a supply circuit configured to feed fuel at a plurality of locations of the combustion device, the supply circuit comprising:
    a plurality of manifolds that collect fuel to be distributed among at least some of the locations,
    ducts extending from the manifolds and feeding at least some of the locations, the ducts comprising first ducts and second ducts, the first ducts including valves having a plurality of predetermined working positions, each working position corresponding to a different fuel flow through the valve, the second ducts not having valves that include multiple working positions,
    a plurality of stages,
    wherein there is a respective one of the manifolds for each of the stages to be fed operatively connected to that stage via at least one of the ducts, the method comprising:
        damping the pulsations by regulating the fuel flow at at least some of the locations by selecting the working position of the valves to change the working positions for at least some of the valves of the first ducts; wherein the first ducts provided with valves feed the same stage.

13. A method for retrofitting a combustion apparatus comprising a combustion device and a supply circuit arranged to feed fuel at a plurality of locations of the combustion device, the supply circuit comprising:
a plurality of manifolds that collect fuel to be distributed among at least some of the locations,
ducts extending from the manifolds and feeding at least some of the locations, the ducts comprising first ducts and second ducts,
a plurality of stages, wherein there is a respective one of the manifolds for each of the stages to be fed operatively connected to that stage via at least one of the ducts, the method comprising:
providing at least some of the first ducts with valves having a plurality of predetermined working positions, each working position corresponding to a different fuel flow through the valve, wherein the first ducts provided with valves feed the same stage; and
providing the second ducts, the second ducts not having any valve having multiple working positions.

14. The method according to claim 13, wherein the combustion device locations whose first ducts are provided with the valves are equally spaced over the combustion device circumference; and
wherein the stages are comprised of a first stage and a second stage and the manifolds are comprised of a first manifold and a second manifold, the method also comprising:
connecting the first manifold to the first stage via at least one of the provided first ducts to supply fuel to that first stage; and
connecting the second manifold to the second stage via at least one of the provided second ducts to supply fuel to that second stage.

15. The combustion apparatus according to claim 1, comprising mixing devices connected to the ducts for mixing fuel with air prior to the mixture of fuel and air being fed to the combustion device for combustion, the mixing devices configured to define a swirl chamber in which air and fuel are mixed together.

16. The combustion apparatus according to claim 15, wherein fuel is supplied via the first ducts connected to the mixing devices, movement of the valves of the first ducts to different working positions adjusting a flow rate of fuel being fed to each of the mixing devices.

17. The combustion apparatus according to claim 16, wherein the locations of the combustion device are spaced over a circumference of the combustion chamber, the mixing devices are connected to the first ducts adjacent the locations; and wherein fuel is supplied into the mixing devices and is mixed with air to generate a mixture that is then fed into the combustion device at the locations to be combusted in the combustion device.

18. The combustion apparatus according to claim 16, comprising a control unit connected to sensors that are housed in or are in communication with the combustion device.

19. The combustion apparatus according to claim 18, wherein the control unit is connected to the valves of the first ducts to drive each valve from between a first working position in which the valve is fully opened and a second position in which the valve is fully closed based on a signal detected from the sensors.

* * * * *